Patented Nov. 17, 1942

2,302,378

UNITED STATES PATENT OFFICE 2,302,378

ADHESIVE

Robert T. Rasmussen, Merrick, N. Y.

No Drawing. Application March 7, 1939,
Serial No. 260,335

4 Claims. (Cl. 260—740)

The invention relates to adhesives, and more particularly to a novel and useful adhesive composition and to a novel process for producing such compositions.

Objects and advantages of the invention will be set forth in part hereinafter and in part will be obvious herefrom, or may be learned by practice with the invention, the same being realized and attained by means of the steps and compositions pointed out in the appended claims.

The invention consists in the novel steps, arrangements, compositions, combinations and improvements herein described.

The invention is directed to providing an adhesive composition suitable for practically all industrial purposes, including bookbinding and tabbing. The composition is also useful in fields where it is necessary to cause a substance or substances to adhere to surfaces that are not permeable to ordinary aqueous adhesives. The invention provides a very strong, tacky adhesive composition having heavy body, which dries and sets very rapidly, but when dry remains very flexible and strong. Furthermore, the invention permits of great variations in the qualities of drying and setting times, which can be controlled within wide limits. The composition of the invention is also of high stability, remaining intact and in perfect condition practically indefinitely. It will not spoil, break down or acquire any disagreeable odor, although a very long period may lapse between its preparation and use. My adhesive is particularly advantageous for bookbinding operations because of its very rapid drying and because of its tackiness and heavy body which permit necessary operations to be performed with speed and certainty prior to the actual setting of the adhesive. It has proved very effective in the so-called "Perfect" binding, which is widely used in the making of telephone directories, for example.

A further object of the invention is to provide an adhesive which may be shipped or handled in cold weather and at low temperatures without danger of freezing. My adhesive also has marked anti-curling and anti-wrinkling qualities which together with its high flexibility after setting make it a very effective agent for laminating materials, especially materials which have smooth or polished surfaces or surfaces which have been varnished, waxed, oiled, inked or are of smooth metal or the like.

Another object of the invention is to provide an adhesive which is not affected by brass, bronze and copper, of which many parts of bookbinding machines are formed.

The invention relates generally to that class of adhesives in which an aqueous dispersion of rubber, preferably the natural rubber emulsion, latex, is combined with an aqueous solution or suspension of casein or other aqueous fluent adhesive stabilizer for latex. Numerous attempts have heretofore been made to provide a stable, flexible adhesive composition utilizing the qualities of latex and casein combined in aqueous dispersion, but such attempts have been commercially unsuccessful, principally because of the instability of the compositions and their relatively slow setting or slow drying action, and lack of tack and body. Such prior compositions tend to break down or decompose into a thin watery liquid having no effective adhesive qualities and having a disagreeable odor. The agitation of such compositions frequently induces break-downs during use, especially upon exposure to air and the presence of moisture and freezing temperatures so that the time within which they could be used and their effectiveness in use were relatively unpredictable.

I have discovered that the break-down of casein solutions is primarily due to the relative quantities of water and casein in the initial composition. A primary object of the present invention is to regulate the ultimate proportions of water, casein and latex in the composition so that the critical ratio of water to casein remains below that which will cause a break-down of the aqueous casein solution. More in detail, it has been erroneously believed heretofore that casein could not be put into aqueous solution or suspension without a minimum proportion of water, that minimum in practice apparently being four and one-half or four parts of water by weight to one of casein, although certain patents and literature indicate that attempts have been made to dissolve casein in quantities of water as low as three to one. Furthermore, the latter addition of water to a previously formed aqueous solution or suspension of casein is known to cause a break-down of the suspension, the whole becoming very thin and watery, far out of proportion to the relative dilution to be expected from the water which has been added. It appears that once a water suspension of casein has been established, the integrity of that suspension or solution can be destroyed by the addition of a relatively small amount of water. For example, if to a water casein composition containing say four parts of water by weight to one of casein there be added a relatively minute quantity of water, the composition almost immediately breaks down into a thin, watery condition. The same is also true even when water be added to a previously established aqueous suspension of casein in which the original quantity of water is substantially less than four to one. In other words, the addition of water to an established aqueous suspension of casein appears to destroy the suspension or emulsion or solution which has been established. Furthermore, the original condition of suspension or solution cannot be reestablished by evaporating or otherwise reducing the proportion of water, nor even by the addition of more dry casein.

In prior attempts to combine latex, which naturally contains a substantial quantity of water, with an aqueous solution of casein, the proportion of water to casein would be materially increased by the addition of the latex. Consequently the resultant composition would be subject to the break-down of the casein in solution as above described, because of the presence of water in quantities above the critical amount.

Accordingly in the preparation of latex-casein compositions, it is important and desirable to maintain the quantity of water used to prepare the original solution of casein at the lowest possible point, thereby to avoid break-down or weakening of the final composition which would otherwise result from the addition of further water entailed in the adding of latex to the composition. The body and tack and viscosity of the final composition depends materially upon the quantity of water in the initial casein solution, so that by keeping the quantity of water therein to the minimum, I am enabled to add a relatively large amount of latex and thus produce adhesives of the desired characteristics, all without endangering break-down of the solution due to the additive water in the latex. Furthermore, the heavy body and rapid drying characteristics of my adhesive are probably primarily due to said low-water content of the casein solution.

In accordance with one major feature of my invention, I have discovered a method of preliminarily putting casein into aqueous solution or dispersion with an amount of water very much less than that heretofore believed to be a necessary minimum. By my novel method I am able to bring casein into aqueous solution with quantities of water as low as one and one-half to one of casein by weight. The amount of water should preferably not exceed two parts to one of casein and never more than two and one-half to one at the outside. Latex may then be added to the low-water solution of casein in proportions sufficient to form an effective adhesive composition but wherein the total proportion of water to casein in the final composition is not sufficiently high to cause the break-down action described above. By thus controlling the water content, the final tack and body or viscosity of the composition can be controlled within desired limits.

I have found that an aqueous solution of casein, with the relatively small proportions of water referred to above, can be produced by introducing the casein into the desired quantity of water which has been heated to an elevated temperature above 120° F. and preferably at or about 160° F. The solution of casein can be expedited by introduction of an alkaline casein solvent, which may be borax, ammonia, one of the caustic alkalis or alkali carbonates. It is also important that the pH of he casein solution be slightly alkaline, preferably between pH8 and pH9.

A composition containing only casein, water and latex in the low-water relation described above will in itself provide a superior adhesive resistant to break-down because of excess water. A typical simple composition would be

|  | Pounds | Percent |
| --- | --- | --- |
| Casein | 5.0 | 13.25 |
| Distilled water | 10.0 | 26.50 |
| Centrifuged 72% latex | 12.5 | 33.75 |
| Natural 60% latex | 10.0 | 26.50 |

The adhesive produced by the above formula alone would be of superior body and tack and of rapid drying qualities; however, it lacks stability over long periods and under changes of temperature and humidity.

A second important feature of the invention which greatly improves the composition described above is the inclusion in the composition of a substance or substances which appear to act as an emulsifying agent to hold the casein and latex together in suspension or solution at the desired viscosity. The present preferred substance for performing this important function is sodium 2-4-5 trichlorphenate, which acts as a stabilizer for the solution, acting to increase the resistance of the rubber dispersion to coagulation and in general imparts greater stability to the composition. Sodium 2-4-5 trichlorphenate also performs its usual function as a preservative thereby inhibiting bacteriological attack and decomposition of the ingredients.

The casein and a suitable quantity of sodium 2-4-5 trichlorphenate solution may be dissolved in such manner that it will affect the body of the composition or latex solution almost in any manner desired. Thus, the viscosity of the latex solution may be increased to have greater tackiness or the latex solution may be transposed to a plastic state by a suitable treatment of the casein and a suitable quantity of sodium 2-4-5 trichlorphenate. The casein and a suitable quantity of sodium 2-4-5 trichlorphenate impart tackiness and a greater clinging tendency to the latex solution. The casein and a suitable quantity of sodium 2-4-5 trichlorphenate also act as a thickener giving body to the thin, watery latex dispersions. For most purposes about 2% of sodium 2-4-5 trichlorphenate has been found most effective.

While the composition as described above will possess the major qualities of a stable and effective adhesive, further improvement may be effected by the inclusion in the composition of a vulcanizer for the rubber or latex constituent, which toughens and preserves the composition. The present preferred vulcanizer is ammonium chloride, but other materials such as sulphur and/or some of the proprietary vulcanizers may be used instead.

Solution of the casein in hot water may be speeded up by the use of a casein disperser or solvent which also will act to swell the latex and in general act as a preservative for the composition. The present preferred substance for this purpose is water-miscible chlorinated benzene. Other casein solvents may be used, among them ammonium, borax, as disclosed above, and also hydrochloric acid or acetic acid. In practice it has been found, however, that the water-miscible chlorinated benzene is preferred and in this respect it is to some extent a substitute for the sodium 2-4-5 trichlorphenate.

Another element of the invention which is optionally useable, depending upon the use to which the adhesive is to be put and the conditions under which it is to be used, is a hygroscopic, high boiling and low freezing water-soluble substance such as glycerine, or a water-soluble glycol. Such substances, glycerine for example, have the faculty of causing the composition to set more slowly, and thus appear to permit the solids in the deposited film to take firmer hold of the surfaces which are being united. The use of glycerine, especially in combination with a suitable quantity of sodium 2-4-5 trichlorphenate, increases the resistance of the latex solution to coagulation and imparts greater stability generally, also making it possible to ship the composition in cold weather with less hazard of freezing or by suitable increase to oven eliminate entirely the problem of freezing in very cold weather. The glycerine ingredient also acts as an anti-curling, anti-wrinkling agent, making the product very effective for laminating.

A perferred basic formula of the important ingredients of the composition is set forth below, it being understood that variations in the proportions therein may be made to suit the particular uses to which the adhesive may be put:

|  | Pounds | Percent |
| --- | --- | --- |
| Casein | 5.0 | 13.25 |
| Distilled water | 10.0 | 26.50 |
| Centrifuged 72% latex | 12.5 | 33.75 |
| Natural 60% latex | 10.0 | 26.50 |

To the water content is added 2% dry sodium 2-4-5 trichlorphenate and .3% ammonium chloride. When glycerine is added, the total should not exceed 5%.

It will be understood that the relative proportions of the various ingredients of the composition may be varied within suitable limits to produce the desired characteristics in the final adhesive, depending upon the use to which the adhesive is to be put. The tackiness and thickness or body of the composition can be controlled by varying the proportions of the ingredients within such limits as have been indicated.

With the foregoing quantities of casein and water as a standard the latex quantities can be increased above those stated and the ratio of the 72% and 60% latexes varied as desired. Increases in the total latex augment flexibility, reduce viscosity and the drying can be somewhat regulated. A relative increase of the heavier 72% latex slows drying, increases toughness, viscosity and rubber content; while an increase in the 60% latex speeds up drying and decreases viscosity.

The order and routine of the processing or compounding of the ingredients is of material importance in producing the desired composition, both with regard to timing and the condition of the various sub-compounds at the time of adding of a new ingredient. The following is an outline of the preferred compounding routine:

The water is heated to 160° F. Into the water is mixed a sufficient quantity of borax to insure the casein being completely dissolved and to keep it on the alkaline side at a point preferably between pH8 and pH9. Into the water is then stirred the 2% sodium 2-4-5 trichlorphenate. Then the powdered casein is sprinkled into the water, stirring rapidly the meanwhile for ten minutes. The resulting mass is covered and set aside to stand for twelve to eighteen hours in a room having a steady temperature of about 70° F. After standing this length of time the casein solution is put in a mixing machine and stirred for ten minutes; then the evaporated 72% latex is added, then the 60% latex, and the whole is stirred for five minutes, during which time the ammonium chloride is added; also the glycerine when used.

The resulting adhesive is characterized by its immediate inherent tackiness which is effective immediately upon application, being a characteristic of the adhesive in the mass before any exposure to drying. It has extremely heavy body and viscosity. It is very quick to set, but even before setting and immediately upon application it has a preliminary tack or adherent quality which is of paramount importance in bookbinding, especially where the so-called "Perfect" system is used. In that system the covers of the books, e. g., telephone directories, are folded about the stack of signatures, to the edge of which the adhesive has been applied. For rapid handling in the binding machine it is essential that the undried adhesive seize and hold the cover to the stack of signatures and it is in this operation that the high tack of my adhesive is peculiarly effective. For other applications it may be desirable to increase the rapidity of final drying of the adhesive at some sacrifice in the initial tack, and that may be accomplished by increasing the relative quantities of the lighter latex as above described. Speed in drying may also be heightened by some increase in the quantity of the ammonium chloride or other vulcanizer for the rubber. I have made adhesives in this way which will permanently set and dry in a period of fifteen seconds. Where a relatively long period of drying is required that may also be accomplished by the addition of glycerine as above described.

It will be understood that equivalents may be substituted for many of the above-described ingredients and to some extent in the steps of the process and variations in the proportions used. While rubber latex is preferred for the rubber ingredient, it is also possible to substitute some of the artificial rubbers, such as "neoprene," "Duprene," etc. Latex as usually obtained commercially contains a preservative of ammonium hydroxide, but it is believed that this is not essential for the formation of the composition.

Substitutes for the sodium 2-4-5 trichlorphenate are other water miscible hydrocarbons such as chlorinated benzene described above, also "Collatone" and in general water-soluble substances which cause proteins to swell or jell. Triple-distilled pine oil has also been found to function fairly well, but none of these substances appear to have the complete stabilizing and viscosity-holding action of the sodium 2-4-5 trichlorphenate. The latter appears to have a swelling action on both the rubber and the casein. With triple-distilled pine oil, for example, the life of the adhesive before break-down, while materially extended is of limited duration. Also the length of stable life varies materially with the amount of moisture of the air at the time the composition is compounded, apparently being a factor in the bacterial action on the latex and casein. In some cases, where rapid formation of the composition is desired, chlorinated benzene is useable either alone or combined with sodium 2-4-5 trichlorphenate as above described. When so used it greatly reduces the time for dissolving the casein. On the other hand the sodium 2-4-5 trichlorphenate appears to provide greater ultimate stability. However, with sodium 2-4-5 trichlorphenate, the stability and life of the composition are maintained practically indefinitely, and regardless of the humidity or other conditions under which the composition is prepared.

In the foregoing description of the effect of water on solutions of casein it is to be understood that the undesirable addition of water thereto, which will cause break-down of the solution, is primarily a factor prior to the mixing of the complete composition. After the latex and other ingredients have been added to the water solution of casein, the composition as a whole is less sensitive to break down through added water than is the aqueous solution of casein per se. I have found that water in limited quantities may be added to the adhesive composition for the purpose of thinning or reducing the viscosity, provided the water is preliminarily treated by the addition thereto of a proportionate quantity of sodium 2-4-5 trichlorphenate. It is undesirable, however, to add water alone without inclusion of the preservative material.

The invention in its broader aspects is not limited to the specific processes and steps described but departures may be made therefrom within the scope of the accompanying claims without departing from the principles of the invention and without sacrificing its chief advantages.

What I claim is:

1. An adhesive composition comprising an aqueous dispersion or solution of casein and latex wherein the amount of water in the composition in addition to that naturally present in the latex is not substantially greater than twice the amount of casein by weight, and sodium 2-4-5 trichlorphenate.

2. An adhesive composition comprising an aqueous dispersion or solution of casein and latex wherein the amount of water in the composition in addition to that naturally present in the latex is not substantially greater than twice the amount of casein by weight, and sodium 2-4-5 trichlorphenate, and a vulcanizing agent for the rubber in the latex.

3. An adhesive composition as follows:

| | Per cent |
|---|---|
| Casein | 13.25 |
| Distilled water | 26.50 |
| Centrifuged 72% latex | 33.75 |
| Natural 60% latex | 26.50 |
| Sodium 2-4-5 trichlorphenate | 2 |
| Ammonium chloride | .3 |

4. The process of making an adhesive which comprises heating water to above 120° F., dissolving therein sodium 2-4-5 trichlorphenate, dissolving therein an amount of casein substantially one-half that of the water by weight, cooling the mixture to room temperature and then mixing latex therewith.

ROBERT T. RASMUSSEN.